United States Patent [19]
Smits et al.

[11] Patent Number: 5,856,678
[45] Date of Patent: Jan. 5, 1999

[54] OPEN-CELLED RIGID POLYURETHANE FOAM

[75] Inventors: Guido F. Smits, Wijnegem, Belgium; Guliano Cini, Hulst, Netherlands; Henri J. M. Grünbauer, Oostburg, Netherlands; Jacobus A. F. Broos, Terneuzen, Netherlands

[73] Assignee: The Dow Chemical Company, Midland, Mich.

[21] Appl. No.: 27,016

[22] Filed: Feb. 20, 1998

Related U.S. Application Data

[62] Division of Ser. No. 777,684, Dec. 20, 1996, Pat. No. 5,721,284.

[51] Int. Cl.$^6$ ..................................................... C08G 18/10
[52] U.S. Cl. ..................... 252/182.2; 521/112; 521/132
[58] Field of Search ...................... 252/182.2; 521/112, 521/132

[56] References Cited

U.S. PATENT DOCUMENTS

| | | | |
|---|---|---|---|
| 2,846,408 | 8/1958 | Brochhagen et al. | 260/2.5 |
| 3,215,652 | 11/1965 | Kaplan | 260/2.5 |
| 3,297,597 | 1/1967 | Edwards et al. | 260/2.5 |
| 3,694,385 | 9/1972 | Salyer et al. | 260/2.5 |
| 4,137,265 | 1/1979 | Edwards et al. | 260/570.9 |
| 4,383,102 | 5/1983 | McDaniel et al. | 528/107 |
| 4,394,491 | 7/1983 | Hoffman | 525/452 |
| 4,500,656 | 2/1985 | Rasshofer et al. | 521/164 |
| 4,704,410 | 11/1987 | Booth et al. | 521/166 |
| 4,704,411 | 11/1987 | Gansow et al. | 521/166 |
| 4,735,970 | 4/1988 | Sommerfeld et al. | 521/128 |
| 5,248,704 | 9/1993 | Rossio et al. | 521/137 |
| 5,284,882 | 2/1994 | Rossio et al. | 521/137 |
| 5,318,997 | 6/1994 | Okada et al. | 521/174 |
| 5,350,777 | 9/1994 | Yuge et al. | 521/117 |
| 5,721,284 | 2/1998 | Smits et al. | 521/112 |

FOREIGN PATENT DOCUMENTS

| | | |
|---|---|---|
| 0 188 806 | 7/1986 | European Pat. Off. |
| 0 547 515 | 6/1993 | European Pat. Off. |
| 0 622 388 | 11/1994 | European Pat. Off. |
| 1 065 590 | 4/1967 | United Kingdom |
| 1 102 391 | 2/1968 | United Kingdom |

*Primary Examiner*—Morton Foelak

[57] ABSTRACT

Disclosed is a process for preparing an open-celled rigid polyurethane foam by reacting a polyisocyanate with a polyol in the presence of a blowing agent, usually water, and a cell opening agent. The cell opening agent comprises a combination of a polyoxyalkylene polysiloxane having a cloud point of 65° C. or less, and a second substance that has a critical surface free energy of less than about 23 mJ/m$^2$. Highly preferred as second substance is fine particulate poly(tetrafluoroethylene) polymer.

7 Claims, No Drawings

OPEN-CELLED RIGID POLYURETHANE FOAM

This application is a Divisional of Ser. No. 08/777,684 filed Dec. 20, 1996 now U.S. Pat. No. 5,721,284.

This invention relates to an open-celled polyurethane foam and a process for its preparation by reacting a polyisocyanate with a polyol in the presence of a blowing agent and a cell opening agent. The cell opening agent is a mixture which comprises a combination of a selected polyoxyalkylene polysiloxane, and a second substance that has a critical surface free energy of less than about 23 mJ/m$^2$.

BACKGROUND OF THE INVENTION

Cellular polymers such as, for example, polyethylene, polystyrene, or polyurethane are of value in many application areas including notably thermal insulation. In this case it is particularly advantageous that such foam exhibits attractive dimensional stability and a relatively stable thermal insulation performance. Both of these traits are largely determined by the cellular structure of the foam and by the composition of the gas(es) within the cell cavity. A finer cell structure generally confers better insulation properties to a foam. However, as cells become finer, that is of smaller diameter, the compressive strength and dimensional stability of the foam frequently becomes inferior. Susceptibility to poor dimensional stability is greatest when the cell cavity contains a gas which is likely to condense or alternatively diffuse out of the cell. Either phenomenon leads to a loss of partial gas pressure within the cell, resulting in poor dimensional stability of the foam. Exemplary of a cell gas noted to diffuse out of a cell cavity, especially of polyurethane, is carbon dioxide. The use of carbon dioxide to prepare cellular polymers and especially polyurethane is presently highly favored as a substitute for many of the commonly used physical blowing agents considered harmful to the ozone layer. In support of the favored use of carbon dioxide, there exists a need to develop an improved process for the preparation of cellular polymers which exhibit attractive dimensional stability and thermal insulation properties. For rigid polyurethane foam, there exists a need for a process which permits the use of carbon dioxide as blowing agent and yet provides for a foam having acceptable dimensional stability and thermal insulation performance.

A potential solution to the dimensional stability problem is to provide a foam with an open-celled structure, that is, a structure where one or more of the cell windows are completely open and not sealed by a membrane, permitting the free passage of air or other gases. Expanded polymer having an open celled structure may be prepared by crushing the expanded polymer after its preparation to break cell windows. The latter means is only available for elastomeric polymers since crushing of rigid cellular polymers would lead to permanent deformation and damage. To provide for cell opening in a rigid polymer, use of a cell opening agent during the process of its manufacture is required. Typically such cell opening agents are high boiling liquids such as, for example, high molecular weight poly(oxyalkylene) adducts. Such methods of preparing open celled rigid polyurethane are disclosed in various patent publications including, for example, U.S. Pat. Nos. 5,284,882; 5,350,777; 5,318,997; 5,248,704; 3,694,385; G.B. 1102,391; G.B. 1,065,590; EP-622,388-A; EP-610,734-A; EP-547,515-A; and EP-A-188,806. However, a disadvantage associated with the use of such cell opening agents is that they generally promote the formation of polymer containing a coarse cell structure and consequently unattractive physical properties including thermal insulation. Thus, there is a need to provide an alternative process for the preparation of rigid open-celled foam which can permit the formation of a foam having a fine cell structure.

SUMMARY OF THE INVENTION

It has now been discovered that a combination of a selected polyoxyalkylene polysiloxane surfactant with a substance, other than a polyoxyalkylene polysiloxane, that has a critical surface free energy of less than about 23 mJ/m$^2$ can function effectively as a cell opening agent and provide for the above expressed needs.

In a first aspect, this invention relates to a process for preparing an open-celled rigid polyurethane foam by reacting an organic polyisocyanate with a polyol in the presence of a blowing agent and a cell opening agent, wherein said cell opening agent is a composition that comprises:
  a) a polyoxyalkylene polysiloxane substance having a cloud point of 65° C. or less; and
  b) a substance that has a critical surface free energy of less than about 23 mJ/m$^2$ and which, when a solid, has an average particle size of about 20 microns or less and, when a liquid, has a boiling point greater than the maximum temperature encountered in the process of preparing the polymer.

In a second aspect, this invention relates to a rigid polyurethane foam prepared according to the mentioned process, wherein said foam has an open cell content of at least 70 percent.

In a third aspect, this invention relates to a composition suitable for use as a cell opening agent when preparing open-celled rigid polyurethane foam comprises:
  a) a polyoxyalkylene polysiloxane having a cloud point temperature of less than about 65° C.; and
  b) a substance that has a critical surface free energy of less than about 23 mJ/m$^2$ and which, when a solid, has an average particle size of about 20 microns or less and, when a liquid, has a boiling point greater than the maximum temperature encountered in the process of preparing the polymer, wherein (a) and (b) are present in a parts by weight ratio of from about 8:0.1 to about 1:8.

In a fourth aspect, this invention relates to a polyisocyanate composition suitable for use when preparing open-celled rigid polyurethane foam which, based on its total weight, comprises:
  i) from about 99.9 to 90 weight percent of an organic polyisocyanate; and
  ii) from about 0.1 to 10 weight percent of a cell opening agent that contains a polyoxyalkylene polysiloxane (a) having a cloud point temperature of less than about 65° C. and being devoid of any isocyanate-reactive functional group, and a substance (b) that has a critical surface free energy of less than about 23 mJ/m$^2$ and which, when a solid, has an average particle size of about 20 microns or less and, when a liquid, has a boiling point greater than the maximum temperature encountered in the process of preparing the polymer, wherein (a) and (b) are present in a parts by weight ratio of from about 8:0.1 to about 1:8.

In a fifth aspect, this invention relates to a polyol composition suitable for use when preparing open-celled rigid polyurethane foam which, based on its total weight, comprises:
  a) from about 99.9 to 90 weight percent of a polyol; and b) from about 0.1 to 10 weight percent of a cell opening agent that contains a polyoxyalkylene polysiloxane (a) having a cloud point temperature of less than about 65° C., and a substance (b) that has a critical surface free energy of less than about 23 mJ/m$^2$ and which when a solid has an average particle size of about 20 microns or less and, when a liquid, has a boiling point greater than the maximum temperature encountered in the process of preparing the polymer, wherein (a) and (b) are present in a parts by weight ratio of from about 8:0.1 to about 1:8.

DETAILED DESCRIPTION OF THE INVENTION

The open-celled rigid polyurethane foam obtained according to the process disclosed herein can be characterized by having an open cell content of at least 70, preferably of at least 80, and more preferably of at least 90 percent of the total cell content. The foam advantageously has an overall free-rise density of at least 25 kg/m$^3$, or alternatively a molded density of at least 30 kg/m$^3$.

The open-celled rigid polyurethane is obtained by reacting an organic polyisocyanate with a polyol in the presence of a blowing agent and a selected cell opening agent. The cell opening agent is a composition which comprises as first component, a selected polyoxyalkylene polysiloxane; and as second component, a substance that has a critical surface free energy of less than about 23 mJ/m$^2$ and which, when a solid, has an average particle size of about 20 microns or less and, when a liquid, has a boiling point greater than the maximum temperature encountered in the process of preparing the polymer.

The polyoxyalkylene polysiloxane component has a cloud point of less than about 65° C., preferably less than about 60° C. and more preferably less than about 50° C., when observed as 4 weight percent solution in water. In a preferred embodiment, the polyoxyalkylene polysiloxane component is devoid of any isocyanate-reactive functionality, notably the polyoxyalkylene polysiloxane is devoid of any hydroxyl functionality. Absence of such functionality provides for isocyanate compatibility. Exemplary of commercially available polyoxyalkylene polysiloxane substances which may be used in the process of this invention include Silicone F-318 available from Shin-etsu Chemical Company Ltd., Surfactant 6164 available from OSI, and the below mentioned products available from Th. Goldschmidt AG, understood to be isocyanate compatible substances,

| Product | Reported Cloud Point |
| --- | --- |
| TEGOSTAB B 1048 | 37° C. |
| TEGOSTAB B 1903 | 50° C. |
| TEGOSTAB B 8407 | 56° C. |

Polyoxyalkylene polysiloxane substances known to have a hydroxyl moiety on the polyoxyalkylene chain include TEGOSTAB B 8408 (cloud point, 81° C.) Th. Goldschmidt; D-193 (cloud point 87° C.) available from Dow Corning; and Silicone F-305, F-308, F-335, and F-338 available from Shin-etsu Chemical Company Ltd. are not suited for use in the practice of the present invention. Other polyoxyalkylene polysiloxane substances having a cloud point greater than 65° C. include, for example, TEGOSTAB B 8427 (cloud point 71° C.).

As mentioned, the second component of the cell opening agent is a substance other than a polyoxyalkylene polysiloxane which is essentially chemically inert under the conditions of preparing the cellular polymer and which has a critical surface free energy of less than about 23, preferably less than about 20, and more preferably less than about 18.5 mJ/m$^2$. An explanation of critical surface free energy is provided on page 425 and following pages of the 1983 publication, "CRC Handbook of Solubility Parameters and other Cohesion Parameters" by A. F. M. Barton published by CRC Press Inc.; ISBN 0-8493-3295-8, incorporated herein by reference. In the case of liquid substances, it is to be appreciated that the critical free surface energy is temperature dependent, as the temperature increases generally as the critical free surface energy decreases. Accordingly, suitable liquids for use as the cell opening agent are those which on exposure to an elevated process temperature have a critical surface free energy of less than about 23 mJ/m$^2$ at the elevated temperature and preferably those which have a critical surface free energy of less than about 23 mJ/m$^2$ at room temperature.

When a solid, the substance has a particle size commensurate with the thickness of the membranes occupying the window regions of the cell. Typically the average particle size is less than about 20, preferably less than about 15, more preferably less than 10, and most preferably less than about 3 microns. With an average particle size of about 10 microns, advantageously the distribution is such that at least 90 percent of the particles are of 10 microns or less; and with an average particle size of about 3 microns or less, then at least about 90 percent of the particles are of less than about 6 microns and at least 10 percent of the particles are less than 1 micron. Such particle sizes and distribution can be determined by conventional laser, non-shear, techniques using equipment such as the Malvern Laser Diffraction Analyzer. It is further advantageous if the particle has a specific surface area of at least 3, preferably at least 4.5 and more preferably at least 6.5 m$^2$/g as determined by krypton absorption. Exemplary of suitable solid, particulate agents include fluorinated polymers comprising poly(trifluoroethylene) with a critical surface energy of 22 mJ/m$^2$; poly (hexafluoropropylene), 16.2 mJ/m$^2$; poly(1,1-dihydroperfluorooctyl methacrylate), 10.6 mJ/m$^2$; and especially poly(tetrafluoroethylene), 18.5 mJ/m$^2$. Particulate PTFE suitable for use in this invention is available commercially and includes products designated by the trademark FLUOROGLIDE available from ICI such as FL1710 and FL1200, and products available from Dupont under the trademark TEFLON including TEFLON MP 1100, TEFLON MP 1200, MP 1300 and MP 1500.

When a liquid, the substance advantageously has a boiling point at atmospheric pressure which is greater than the maximum process temperature encountered during the preparation of the cellular polymer. If the liquid agent has a boiling point significantly less than the maximum process temperature, it will function predominantly as a blowing agent. By "significantly less" it is understood a boiling point which is at least 10° C. below the maximum process temperature. Typical process temperatures for an extrusion process of a thermoplastic polymer are at least 100° C. Alternatively, such a process may be a reactive molding process such as employed in the preparation of thermoset polymer, notably polyurethane, where a temperature in excess of 100° C. may frequently be encountered. Accordingly, suitable liquid agents include those substances which advantageously have an atmospheric boiling point of at least 100° C., preferably at least 130° C., and more preferably at least 150° C. and most preferably at least 175° C., and where such substances are insoluble or only sparingly soluble in the polymer or precursors thereof. Suitable liquid agents include organic polyfluoro- and especially perfluorocarbon compounds which advantageously have an average molecular weight of at least 350 and preferably at least 400. Exemplary of suitable liquid agents include the fluorinated organic compounds marketed by 3M under the trademark FLUORINERT including substances identified as FC-104, FC-75, FC-40, FC-43, FC-70, FC-5312 and FC-71, and substances marketed by Rhone-Poulenc under the trademark FLUTEC including substances identified as PP3, PP6, PP7, PP10, PP11 PP24 and PP25. Such liquid agents typically have a critical free surface energy of from about 9 to about 16 $mJ/m^2$ at room temperature. In a highly preferred embodiment of this invention, it is preferred to use as first component of the cell opening agent composition, a polyoxyalkylene polysiloxane component that is devoid of any isocyanate-reactive functionality and further has a cloud point of less than 65° C.; and as second component, a solid particulate substance as above described.

In the process of this invention, the polyoxyalkylene polysiloxane is present in an amount of from about 1 to about 8, preferably from about 2 to about 6 and more preferably from about 2 to about 5 parts per 100 parts by weight of polyol, or alternatively by weight of polyisocyanate, if introduced by way of the polyisocyanate component.

In the process of this invention, the substance having a critical surface free energy of less than about 23 $mJ/m^2$ is present in an amount of from about 0.1 to about 8, preferably from about 0.5 to about 5 and more preferably from about 2.5 to about 5 parts per 100 parts by weight of polyol, or polyisocyanate.

In a preferred embodiment, the cell opening agent contains the polyoxyalkylene polysiloxane in an amount of from about 2 to about 6 parts per 100 parts by weight; and the substance having a critical surface free energy of less than about 23 $mJ/m^2$ in an amount of from about 2.5 to about 5 parts per 100 parts by weight of polyol, or polyisocyanate.

In the present invention it is to be appreciated that the cell opening agent may be provided to the process as a separate composition comprising as principle components the polyoxyalkylene polysiloxane (I) in combination with the substance (II) having a critical surface free energy of less than about 23 $mJ/m^2$. Advantageously, the composition comprises (I) and (II) in a parts by weight ratio of from about 8:0.1 to about 1:8, preferably from about 6:0.5 to about 5:2. In addition to its principle components such composition can further comprise water. Alternatively, the cell opening agent may be provided to the process by way of preblending the principle components with polyisocyanate to give a polyisocyanate composition, or by preblending with a polyol to give a polyol composition. The polyisocyanate or polyol composition advantageously comprises the cell opening agent in an amount of from about 0.1 to about 10, preferably from about 2 to about 8 percent, based on the total weight of the composition, with the proportion of polyether-modified polysiloxane and substance having a critical surface free energy of less than about 23 $mJ/m^2$ being in the weight ratio as described herein above. Polyisocyanates or polyols are as described hereinafter.

Suitable polyisocyanates include aromatic, aliphatic and cycloaliphatic polyisocyanates or combinations thereof. A crude polyisocyanate may also be used in the practice of this invention, such as the crude toluene diisocyanate obtained by the phosgenation of a mixture of toluene diamines or the crude diphenylmethane diisocyanate obtained by the phosgenation of crude methylene diphenylamine. The preferred polyisocyanates are aromatic polyisocyanates such as disclosed in U.S. Pat. No. 3,215,652, incorporated herein by reference. Especially preferred are methylene-bridged polyphenyl polyisocyanates and mixtures thereof with crude diphenylmethane diisocyanate, due to their ability to cross-link the polyurethane.

Suitable polyols include those which are conventionally used in the preparation of rigid polyurethane foam and which typically have an average hydroxyl equivalent weight of from about 50 to about 700, preferably from about 70 to about 500, more preferably from about 70 to about 300. Additionally, such polyols will generally contain from about 2 to about 8, preferably from about 3 to about 8, and more preferably from about 3 to about 6 hydroxyl groups per molecule. Examples of suitable polyols are polyether polyols as described more fully in U.S. Pat. No. 4,394,491 and incorporated herein by reference. Exemplary of such polyether polyols include those commercially available under the trademark, VORANOL and include VORANOL 202, VORANOL 360, VORANOL 370, VORANOL 446, VORANOL 490, VORANOL 575, VORANOL 640, VORANOL 800 all sold by The Dow Chemical Company. Other preferred polyols include alkylene oxide derivatives of Mannich condensate as taught in, for example, U.S. Pat. Nos. 3,297,597; 4,137,265 and 4,383,102, and aminoalkylpiperazine-initiated polyether polyols as described in U.S. Pat. Nos. 4,704,410 and 4,704,411.

When preparing a cellular polymer according to this invention there is present a blowing agent. The blowing agent is present in an amount to provide the cellular polymer with the desired overall density. The blowing agent employed comprises carbon dioxide, advantageously generated in-situ by the reaction of water with polyisocyanate, optionally in combination with a physical blowing agent. Carbon dioxide may also be chemically obtained by other means including the amine/carbon dioxide complexes such as disclosed in U.S. Pat. Nos. 4,735,970 and 4,500,656 for use as a blowing agent. Suitable physical blowing agents include, for example, volatile (cyclic)alkanes such as (cyclo) pentane, (cyclo)hexane or halogen-containing substances such as (per)fluorocarbons and the hydrogen-containing chlorofluorocarbon compounds exemplary of which include dichlorofluoromethane, chlorodifluoromethane, dichlorotrifluoroethane, chlorotetrafluoroethane, trifluoroethane, tetrafluoroethane, dichlorofluoroethane, chlorodifluoroethane, fluoroethane, perfluoropentane, perfluorohexane and the like. The selection of physical blowing agent is not a critical feature of this invention, as the resulting foam product is essentially open-celled, it will not be found in the foam and will not influence physical properties such as, for example, insulation performance. When desiring to enhance processing properties such as, for example, flow then to advantage a physical blowing agent can be present. Suitable physical blowing agents found to be effective for this purpose include lower alkanes such as, for example, pentane. In a highly preferred embodiment of this invention, the blowing agent consists essentially of water. Typically for this purpose, the amount of water present is from about 0.5 to about 15, preferably from about 2.0, more preferably from about 3.0, and preferably up to about 10, more preferably up to about 8 parts per 100 parts by weight of polyol. When a physical blowing agent is present, typically the amount is from about 0.5 to about 10, preferably from about 1 to about 5, parts per 100 parts by weight of polyol.

Optionally, other ingredients may be present when preparing the polyurethane foam. Among these other ingredients are catalysts, surfactants, colorants, antioxidants, reinforcing agents, fillers, antistatic agents and flame retardants. Suitable flame retardants include phosphorus containing substances such as tris(chloroalkyl)phosphate and trisalkylphosphates, for example, triethylphosphate; and nitrogen containing substances such as melamine or guanidine carbonate.

One or more catalysts for the reaction of the active hydrogen-containing compound with the polyisocyanate are advantageously present. Suitable catalysts include tertiary amine compounds and organometallic compounds. Exemplary tertiary amine catalysts include triethylenediamine, N-methylmorpholine, pentamethyldiethylenetriamine, tetramethylethylenediamine, 1-methyl-4-dimethylaminoethylpiperazine, 3-methoxy-N-dimethylpropylamine, N-ethylmorpholine, diethylethanolamine, N-cocomorpholine, N,N-dimethyl-N', N'-dimethylisopropylpropylenediamine, N,N-diethyl-3-diethylaminopropylamine, dimethylbenzylamine and the like. Exemplary organometallic catalysts include organomercury, organolead, organoferric and organotin catalysts, with organotin catalysts being preferred among these. Suitable tin catalysts include stannous chloride, tin salts of carboxylic acids such as dibutyltin di-2-ethyl hexanoate, as well as other organometallic compounds such as are disclosed in U.S. Pat. No. 2,846,408. A catalyst for the trimerization of polyisocyanates and formation of polyisocyanurate polymers, such as an alkali metal alkoxide, alkali metal carboxylate, or quaternary amine compound, may also optionally be employed herein. When employed, the quantity of catalyst used is sufficient to increase the rate of polymerization reaction. Precise quantities must be determined experimentally, but generally will range from about 0.01 to about 3.0 parts by weight per 100 parts polyol depending on the type and activity of the catalyst.

The amount of polyisocyanate present when preparing the polyurethane foam is such to provide from about 0.6 to about 3.0 isocyanate groups per isocyanate reactive atom present in the polyol(s) and any water that may be present. Preferably the amount of isocyanate is such to provide from about 0.7, more preferably from about 0.8, and preferably up to about 2, more preferably up to about 1.6, and yet more preferably up to about 1.05 isocyanate groups per isocyanate reactive atom.

The polyurethane foam of this invention is of value for the construction industry and appliance industry where its open-cell trait gives utility in the preparation of vacuum panels.

SPECIFIC EMBODIMENTS OF THE INVENTION

The invention is illustrated by way of the examples given herein below, which are not to be considered as limiting the scope of the invention. Unless otherwise indicated, all amounts given are parts by weight.

The raw materials used in the examples are presented in more detail hereinafter.

| | |
|---|---|
| DMCHA | dimethylcyclohexylamine |
| PMDETA | pentamethyldiethylenetriamine |
| VORANATE 229 | a crude polymethylene polyphenyl polyisocyanate with an isocyanate content of about 31, available from The Dow Chemical Company. |
| Polyol A: | A formulated polyol containing the following components (amounts in parts by weight): |
| 30 | VORANOL RN 411, an oxypropylene adduct of sucrose/glycerine of 411 hydroxyl number, available from The Dow Chemical Company; |
| 42.6 | Polyol 585, an experimental oxypropylene-oxyethylene adduct of a phenol/formaldehyde adduct of hydroxyl number 196 and 3.3 average functionality; |
| 7.5 | poly(oxyethylene) glycol, molecular weight 200; |
| 7.5 | poly(oxyethylene) glycol, molecular weight 400; |
| 7.5 | VORANOL 1421, an oxypropylene-oxyethylene adduct of glycerine of 35 hydroxyl number, available from The Dow Chemical Company; |
| 18.8 | VORANOL RA, 640 an oxypropylene adduct of ethylene diamine of 640 hydroxyl number, available from The Dow Chemical Company. |
| Polyol B: | A formulated polyol containing the following components (amounts in parts by weight): |
| 46.7 | VORANOL RN 411 an oxypropylene adduct of sucrose/glycerine of 411 hydroxyl number, available from The Dow Chemical Company; |
| 66.5 | Polyol 585, an experimental oxypropylene-oxyethylene adduct of a phenol/formaldehyde resin with hydroxyl number 196 and 3.3 average functionality; |
| 11.7 | poly(oxyethylene) glycol, molecular weight 200; |
| 11.7 | poly(oxyethylene) glycol, molecular weight 400; |
| 11.7 | VORANOL 1421, an oxypropylene-oxyethylene adduct of glycerine of 35 hydroxyl number, available from The Dow Chemical Company; |
| 29.3 | VORANOL RA640, an oxypropylene adduct of ethylene diamine of 640 hydroxyl number, available from The Dow Chemical Company. |
| Polyol C: | A formulated polyol containing the following components (amounts in parts by weight): |
| 17.2 | VORANOL RN 411, an oxypropylene adduct of sucrose/glycerine of 411 hydroxyl number, available from The Dow Chemical company; |
| 35.1 | Polyol 585, an experimental oxypropylene-oxyethylene adduct of a phenol/formaldehyde resin with hydroxyl number 196 and 3.3 average functionality; |
| 4.3 | poly(oxyethylene) glycol, molecular weight 200; |
| 4.3 | poly(oxyethylene) glycol, molecular weight 400; |
| 34.5 | VORANOL 1055, an oxypropylene adduct of glycerine of 168 hydroxyl number, available from The Dow Chemical Company; |
| 4.3 | VORANOL 1421, an oxypropylene-oxyethylene adduct of glycerine ot 35 hydroxyl number, available from The Dow Chemical Company; |
| 10.7 | VORANOL RA 640, an oxypropylene adduct of ethylene diamine of 640 hydroxyl number, available from The Dow Chemical Company; |
| 21.5 | VORANOL RN 482, an oxypropylene adduct of sorbitol of 470 hydroxyl number, available from The Dow Chemical Company. |
| Polyol D: | A formulated polyol containing the following components (amounts in parts by weight) |
| 9.5 | VORANOL RN 411, an oxypropylene adduct of sucrose/glycerine of 411 hydroxyl number, available from The Dow Chemical company; |
| 19.3 | Polyol 585, an experimental oxypropylene-oxyethylene adduct of a phenol/formaldehyde resin with hydroxyl number 196 and 3.3 average functionality; |
| 2.4 | poly(oxyethylene) glycol, molecular weight 200; |
| 2.4 | poly(oxyethylene) glycol, molecular weight 400; |
| 19 | VORANOL 1055, an oxypropylene adduct of glycerine of 168 hydroxyl number, available from The DOW Chemical Company; |
| 2.4 | VORANOL 1421, an oxypropylene-oxyethylene adduct of glycerine of 35 hydroxyl number, available from The Dow Chemical Company; |
| 5.9 | VORANOL RA 640, an oxypropylene adduct of ethylene diamine of 640 hydroxyl number, available from The Dow Chemical Company; |
| 11.8 | VORANOL RN 482, an oxypropylene adduct of sorbitol of 470 hydroxyl number, available from The Dow Chemical Company. |
| Surfactant I: | TEGOSTAB B1048, available from Th. Goldschmidt, having a cloud point of 37° C. |

| | |
|---|---|
| | and understood to be devoid of isocyanate-reactive functional groups. |
| Surfactant II: | TEGOSTAB B8408, available from Th. Goldschmidt, having a cloud point of 81° C. and understood to contain hydroxyl functionality, and therefore comparative. |
| TEFLON MP 1100: | particulate poly(tetrafluoroethylene) available from Dupont. |

EXAMPLE 1

Open-celled rigid polyurethane foam is prepared according to the formulation given in Table 1. The physical properties where reported are observed according to the following test procedures: compression hardness, DIN 53421; and open/closed cell content according to ASTM D 2856.

TABLE 1

| Formulation | Foam 1 | Foam A* | Foam B* | Foam 2 | Foam C* | Foam D* | Foam E* |
|---|---|---|---|---|---|---|---|
| Polyol A | 114 | 114 | 114 | / | / | / | 114 |
| Polyol B | / | / | / | 178 | 178 | 178 | / |
| Surfactant I (B1048) | 2.51 | / | / | 3.9 | / | / | 2.51 |
| Surfactant II (B8408) | / | 2.51 | 2.51 | / | 3.9 | 3.9 | / |
| TEFLON MP 1100 | 3.74 | 0.37 | 3.74 | 5.9 | 5.9 | 0.59 | / |
| Water | 6.27 | 6.27 | 6.27 | 9.8 | 9.8 | 9.8 | 6.27 |
| PMDETA | 0.06 | 0.06 | 0.06 | 0.1 | 0.1 | 0.1 | 0.06 |
| DMCHA | 1 | 1 | 1 | 1.56 | 1.56 | 1.56 | 1 |
| VORANATE M229 (index) | 110 | 110 | 110 | 110 | 110 | 110 | 110 |
| Density (kg/m$^3$) | 28.3 | 29.1 | 28.7 | 43.4 molded | 43.4 molded | 43.5 molded | 26.2 |
| Compressive Strength (kpa) parallel/perpendicular | 189 / 78 | 240 / 71 | 228 / 80 | 254 / 224 | 255 / 241 | 284 / 268 | 151 / 45 |
| Open-cell content % | 97 | 21 | 58 | 96 | 51 | 11 | 21 |

Foams 1 and 2 exhibit a significantly higher open cell content than comparative foams A to E and emphasize the importance of selecting the correct polyoxyalkylene polysiloxane. With reference to Foam E, it is clearly demonstrated that it is only the combination of selected polysiloxane with substance of low critical free surface energy that provides for the effective formation of an open-celled foam.

In our studies the particulate poly(tetrafluoroethylene) polymer has been completely substituted by other fine particulate matter such as aluminum oxide, AEROSIL R202 available from Degussa AG, when preparing polyurethane foam. In this case open-cell contents of between 20 and 30 percent are observed. Combinations of particulate aluminum oxide and particulate poly(tetrafluoroethylene) are only found to be effective in the production of open-celled rigid polyurethane foam when combined with the required type of polyoxyalkylene polysiloxane.

In additional studies, Surfactant II has been substituted by (comparative) Surfactant III, TEGOSTAB B8427, available from Th. Goldschmidt, having a cloud point of 71° C. and understood to bear hydroxyl functionality. Rigid polyurethane foam prepared in the presence of 1.7 parts Surfactant III and 4.4 parts of TEFLON MP1100 was observed to have an open-cell content of 64 percent. Comparison of foam data associated with the comparative surfactants is suggestive that the characterizing feature of cloud point of the polyoxyalkylene polysiloxane is of importance.

EXAMPLE 2

This example demonstrates the variance in amount of polyoxyalkylene polysiloxane and substance of low critical surface energy which can be employed when preparing open-celled polyurethane foam. Formulation details and resulting foam physical properties are reported in Table 2.

TABLE 2

| Formulation | Foam 3 | Foam 4 | Foam 5 | Foam 6 | Foam 7 | Foam 8 | Foam 9 | Foam 10 |
|---|---|---|---|---|---|---|---|---|
| Polyol C | 132 | 132 | 132 | 132 | / | / | / | / |
| Polyol D | / | / | / | / | 72.5 | 72.5 | 72.5 | 72.5 |
| Surfactant I (B1048) | 2.3 | 1.7 | 1.15 | 0.6 | 1.26 | 0.95 | 0.6 | 0.3 |
| TEFLON MP 1100 | 7.16 | 7.16 | 7.16 | 7.16 | 3.94 | 3.94 | 3.94 | 3.94 |
| Water | 5 | 5 | 5 | 5 | 2.76 | 2.76 | 2.76 | 2.76 |
| PMDETA | 0.14 | 0.14 | 0.14 | 0.14 | 0.08 | 0.08 | 0.08 | 0.08 |
| DMCHA | 1.29 | 1.29 | 1.29 | 1.29 | 0.71 | 0.71 | 0.71 | 0.71 |
| VORANATE M229 (index) | 115 | 115 | 115 | 115 | 115 | 115 | 115 | 115 |
| Density (kg/m$^3$) | 33.7 | 33.6 | 34 | 33.8 | 39.8 | 38.7 | 38.0 | 37.1 |
| Compressive Strength (kpa) parallel/perpendicular | 221 / 107 | 222 / 105 | 215 / 118 | 194 / 114 | 294 / 107 | 275 / 106 | 275 / 109 | 237 / 112 |
| Open-cell content % | 96 | 97 | 97 | 97 | 88 | 96 | 97 | 97 |

What is claimed is:

1. A polyol composition suitable for use when preparing open-celled rigid polyurethane foam which, based on its total weight, comprises:
   a) from about 99.9 to 90 weight percent of a polyol; and
   b) from about 0.1 to 10 weight percent of a cell opening agent that contains a polyoxyalkylene polysiloxane (a) having a cloud point temperature of less than about 65° C., and a substance (b) that has a critical surface free energy of less than about 23 mJ/m$^2$ and, which when a solid, has an average particle size of about 20 microns or less and, when a liquid, has a boiling point greater than the maximum temperature encountered in the process of preparing the polymer, wherein (a) and (b) are present in a parts by weight ratio of from about 8:01 to about 1:8.

2. The composition of claim 1 wherein the substance is solid and comprises poly(trifluoroethylene), poly(tetrafluoroethylene), poly(hexafluoropropylene) or poly(1,1-dihydro-perfluorooctyl methacrylate) polymer.

3. The composition of claim 2 where the solid substance is poly(tetrafluoroethylene).

4. The composition of claim 1 wherein the substance is a liquid having a boiling point at atmospheric pressure of at least 130° C. and is an organic polyfluoro- or perfluorocarbon compound of molecular weight greater than 350 which is insoluble or sparingly soluble in the polyisocyanate or polyol.

5. The composition of claim 1 wherein the polyoxyalkylene moiety of the polyoxyalkylene polysiloxane is devoid of any isocyanate-reactive functional group.

6. The composition of claim 1 wherein the polyoxyalkylene polysiloxane is present in an amount of from about 1 to about 8 parts per 100 parts of polyol.

7. The composition of claim 1 wherein the substance having a critical surface free energy of less than about 23 mJ/m$^2$ is present in an amount of from about 0.1 to about 8 parts per 100 parts of polyol.

* * * * *